April 11, 1961  P. FAHLENBERG  2,978,970
PHOTOGRAPHIC SHUTTER CONSTRUCTION
Filed Aug. 20, 1957  3 Sheets-Sheet 1
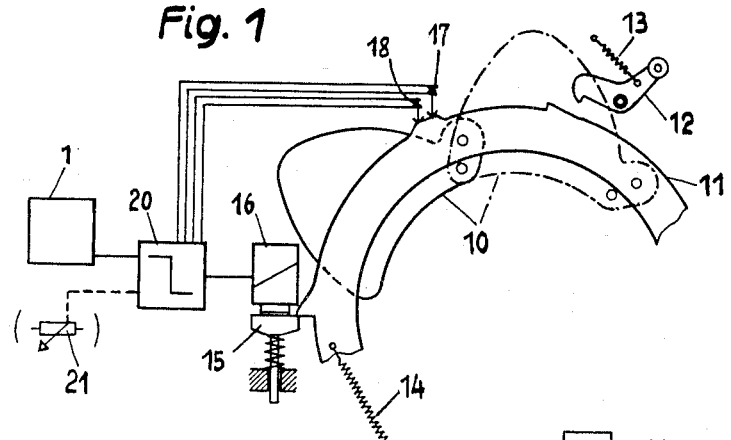
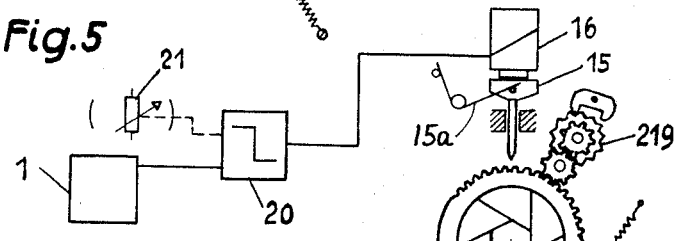
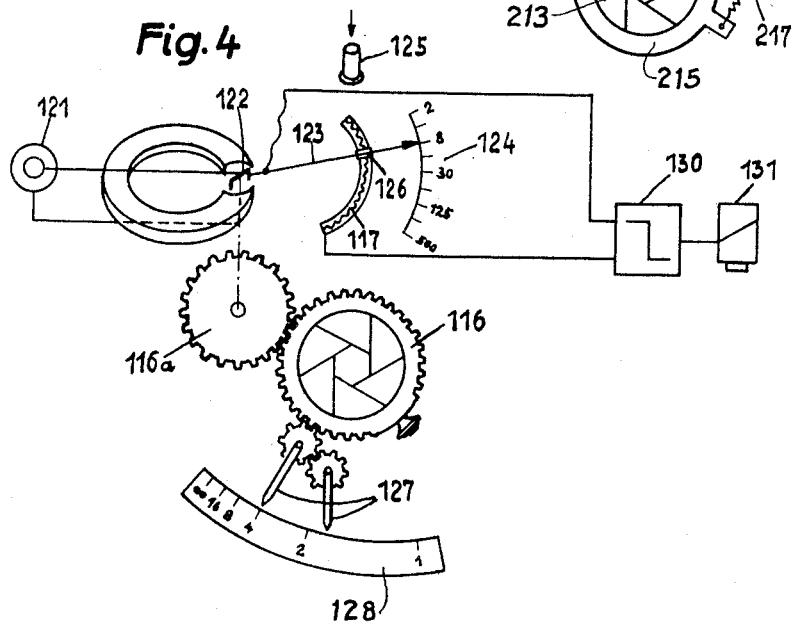

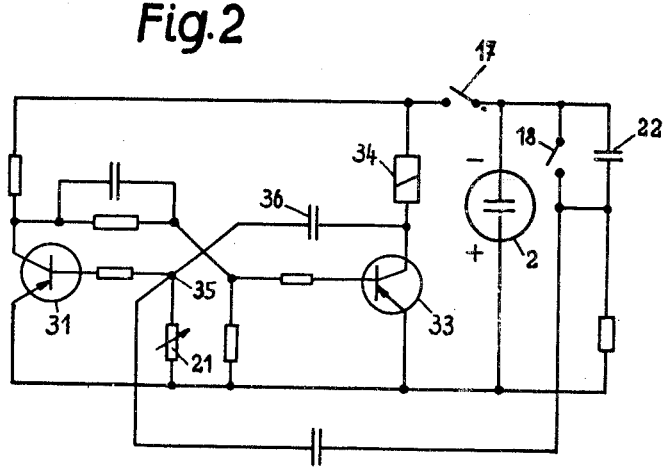

April 11, 1961     P. FAHLENBERG     2,978,970
PHOTOGRAPHIC SHUTTER CONSTRUCTION
Filed Aug. 20, 1957     3 Sheets-Sheet 3
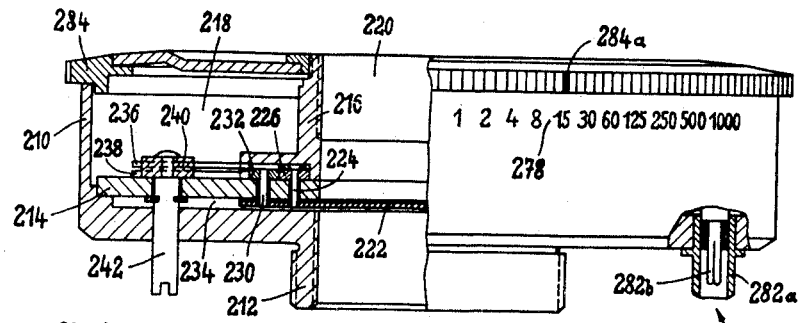
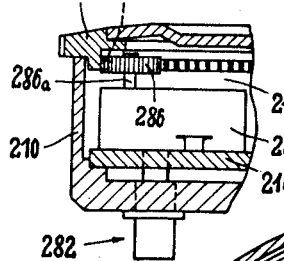
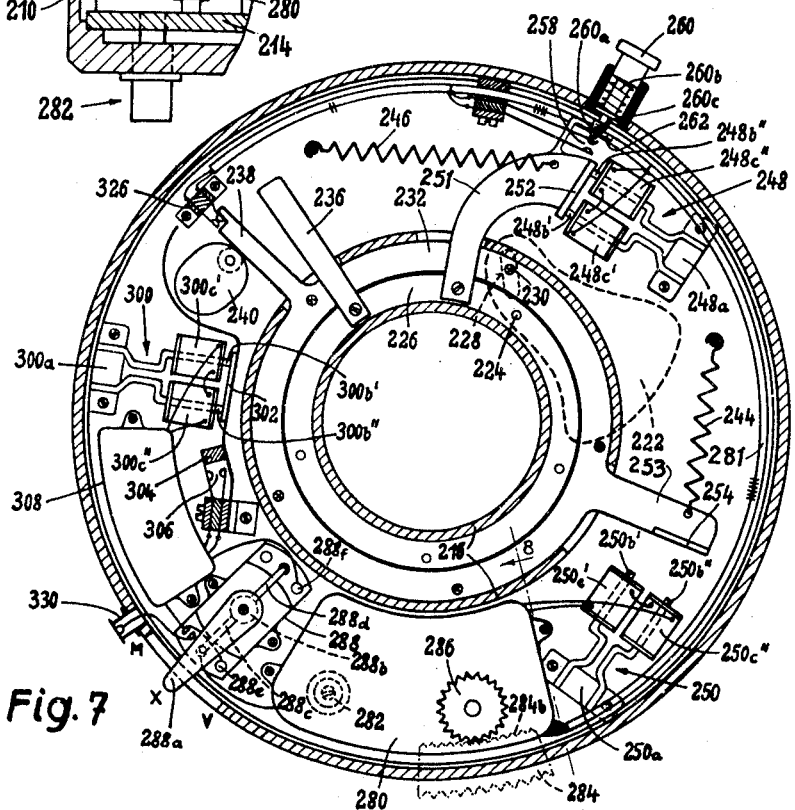

United States Patent Office 2,978,970
Patented Apr. 11, 1961

2,978,970

PHOTOGRAPHIC SHUTTER CONSTRUCTION

Paul Fahlenberg, Baierbrunn, near Munich, Germany, assignor, by mesne assignments, to Compur-Werk Friedrich Deckel OHG, Munich, Germany, a German firm Filed Aug. 20, 1957, Ser. No. 679,270

Claims priority, application Germany Aug. 23, 1956

6 Claims. (Cl. 95—11.5)

This invention relates to the construction of photographic apparatus, and more particularly to the construction of a shutter, and especially to the construction of mechanism for timing the various movements of the shutter.

The need for accurate timing of one movement with relation to another occurs in various ways in a photographic shutter. The most obvious of these is the timing of the closing motion of the shutter blades with relation to the previous opening motion thereof, since it is this timing which determines the length or duration of the exposure, commonly referred to as the shutter speed. When the shutter is to be used for taking flash photographs rather than natural light photographs, there is also a need for timing the exposure opening of the blades with relation to the ignition of the flash bulb or other flash device, so that the maximum illumination produced by the flash device will occur at a time when the shutter blades are fully open. Allowance must be made for the time interval between ignition of the flash device and maximum illumination thereof, which time interval is practically zero in certain types of flash device, and may be considerably greater (e.g., 20 or 25 milliseconds) in certain other commonly used types of flash device.

Still another occasion for being concerned with timing is when the shutter blades are to be opened in a delayed manner, that is, at some interval after the shutter is tripped or triggered, so that the operator who trips or triggers the shutter may have an opportunity to move his position in order to get into the picture which is to be taken.

An object of the invention is the provision of a generally improved and more satisfactory shutter construction, especially one in which the timing of the shutter is more accurately controlled, in a more simple and less expensive and more reliable manner, than has been possible heretofore.

Another object is the provision of improved and simple means for controlling the operation of the shutter electronically, rather than by the mechanical means commonly used heretofore, thus avoiding the many difficulties encountered in mechanically timing the various operations of the shutter.

The timing intervals or delay intervals which must be provided for in modern photographic shutters, cover an extremely wide range. For example, the interval between opening movement and closing movement of shutter blades may at times be only one millisecond or less, when very fast exposures of extremely short duration are to be made, or may be a thousand times as great as this, when an exposure of one second is desired. Also, the time interval between tripping or triggering the shutter and the opening movement of the blades, when it is desired to enable the operator to get into the picture himself, may be as great as ten seconds or more. If reliance is placed upon mechanical timing means, it is apparent that timing mechanism suitable for timing an interval in the neighborhood of one millisecond must ordinarily be of quite different design from one establishing a time interval of, say, ten seconds. In shutters as heretofore used, this has involved more costly tooling and production, because of the need for different designs of timing mechanisms to accomplish different purposes in the shutter structure.

Another object of the present invention, therefore, is the provision of a simplified basic design of timing unit, operating upon electronic principles, which is suitable for establishing or controlling time intervals having a very wide range of values, thus promoting mass production of one basic form of timing unit, rather than the necessity for separate design and construction of smaller quantities of different units.

Still another object is the provision of a shutter in which various actuating members are held in cocked or tensioned position by various locking magnets, and in which the various locking magnets are released in properly timed sequence to each other by electronic timing means.

A further object is the provision of a photographic shutter in which the mechanical moving parts are reduced to a minimum and are of relatively simple construction, and in which the timing is accomplished by electronic parts which are mainly mounted in stationary position within the shutter housing, thus being not subject to wear or vibration.

A still further object is the provision of electronic timing means for a photographic shutter, so designed and constructed as to be sufficiently simple and compact so that it can be incorporated, as a practical matter, in relatively inexpensive photographic shutters of quite small size.

These and other desirable objects may be attained in the manner disclosed as an illustrative embodiment of the invention in the following description and in the accompanying drawings forming a part hereof, in which:

Fig. 1 is a diagrammatic view of a photographic shutter equipped with a timing or retarding device according to one simple aspect of the present invention;

Fig. 2 is a diagram of the electronic circuit for the construction illustrated in Fig. 1;

Fig. 3 is a diagrammatic view of an alternate form of locking magnet used for controlling the mechanical shutter blades;

Fig. 4 is a diagrammatic view of a modified form of the invention;

Fig. 5 is a diagrammatic view of still another modification of the invention;

Fig. 6 is a view partly in elevation and partly in radial section of a shutter in accordance with a preferred embodiment of the invention;

Fig. 7 is a face view of the shutter shown in Fig. 6, with the cover plate and certain other overlying parts removed in order to show the construction beneath;

Fig. 8 is a fragmentary radial view taken approximately on the line 8—8 of Fig. 7; and Fig. 9 is a circuit diagram of the electronic control means used in the shutter of Figs. 6–8.

The same reference numerals throughout the several views indicate the same parts.

Referring first to the simple embodiment of the invention illustrated in Fig. 1, this figure is intended to illustrate schematically an objective shutter having the usual pivoted shutter blades indicated at 10, of any suitable number, the opening and closing movements of which are controlled by a ring 11 rotatable concentrically about the optical axis. The operative connection between the ring 11 and the blades 10 may be of any suitable known kind; for example, the ring 11 in the present construction may correspond functionally to the master ring or master member 5 in Deckel and Geiger Patent 1,687,123, issued October 9, 1928, and this ring 11 is turned in a clockwise direction to cook the shutter ready for an exposure, thereby tensioning the power spring 14. The shutter is held in cocked or tensioned position by a pawl 12 normally held in locking position by its spring 13, this pawl corresponding functionally to the pawl 95 and trigger or release member 101 in said Deckel and Geiger patent.

When the pawl 12 is moved to release position by pressure of the finger of the operator, the power spring 14 starts to turn the master member 11 in a counterclockwise direction. During the first part of its counterclockwise movement, the motion of the master member serves to open the shutter blades, and during the latter part of its counterclockwise movement it serves to close the shutter blades, in the same way in which the counterclockwise movement of the master member 5 in said Deckel and Geiger patent likewise serves to open and then to close the shutter blades.

For exposures of longer duration than the shortest duration possible with the shutter, a delaying mechanism is provided for slightly delaying the return or counterclockwise movement of the master member 11, after the shutter blades are opened and before they are closed, so as to provide an exposure of the desired duration or length. In the shutter shown in said Deckel and Geiger patent, as in most of the conventional objective shutters heretofore known, this delay of the movement of the master member is accomplished by mechanical means, and more specifically by a clockwork or gear retard mechanism. According to the present invention, however, electronic means is used for determining the extent of retarding the return movement of the master member, thereby eliminating the clockwork retarding means heretofore used and obviating the difficulty of precise manufacture of such clockwork retarding means and the effect of wear on the various moving parts thereof.

The master member 11 is shown in Fig. 1 in an intermediate position, in which the blades 10 are fully open and have not yet started to close. In this position, a lug on the master member 11 engages with an armature 15 of the magnet 16, stopping the further movement of the master member and thus holding the blades in open position, until the armature 15 is moved to a position releasing the master member so that it can complete its movement and close the shutter blades. Consequently it is seen that the duration of the exposure will depend upon the length of time that the armature 15 remains in a position obstructing the movement of the master member.

During the counterclockwise motion of the ring 11, before it engages with and is stopped by the armature 15, a projection on the ring engages and closes the two electric switches 17 and 18, connected by suitable electric conductors to the electronic delay element or timing unit schematically indicated by the block 20. This delay element, of suitable form known per se in the electronic art, produces an electric pulse in its output circuit at the end of a certain controllable period of time after the switch or contact 18 has been closed, the switch or contact 17 having previously been closed. This pulse in the output circuit of the device 20 is applied to the locking magnet 16, thereby releasing the armature 15 which may now move away from the maget 16 far enough to allow the shoulder on the ring 11 to slip by the armature, under the influence of the power spring 14, so that the ring 11 completes its movement and closes the shutter blades. Thus it is seen that the time that the blades are open depends upon the time interval between the closing of the switch 18 and the release of the armature 15, and this in turn depends upon the delay period controlled by the electronic delay element or timing unit 20. This, in turn, can be varied for instance by means of a manual control element such as the variable resistor 21 shown in dotted lines. Or instead of using a manual control, the time delay period can be controlled directly by the output of a photoelectric cell serving as a light meter or exposure meter pointed toward the object to be photographed.

The time delay mechanism represented diagrammatically by the block 20 in Fig. 1, may take the form shown diagrammatically in Fig. 2, which illustrates necessary details of a time delay circuit using transistors. The two principal elements are the two transistors 31 and 33. The closing of the switch 17 (accomplished by movement of the ring 11, as previously explained) serves to switch on the power supply source 2, which may be a battery or any other suitable source of electric energy. The closing of the switch or contact 18, also accomplished by the movement of the ring 11, triggers the pulse which marks the beginning of the time delay. This is a negative pulse produced by discharge of a capacitor 22, and is applied at a point 35, thereby rendering the transistor 31 conductive. The time constant of the circuit is determined by the setting of the variable resistor 21, in combination with the capacitance of the capacitor 36, and the values of the various fixed resistors shown as small rectangles. This time constant controls the instant when the output pulse is generated. When this occurs, current will flow through the winding 34 of the locking magnet of the system, this being the same magnet indicated at 16 in Fig. 1. The locking magnet is preferably a permanent magnet which normally attracts and holds the armature 15 against the force of the ring 11, until current flows through the winding of the magnet 16 (or 34) and the flow of current through the winding demagnetizes the permanent magnet sufficiently so that, under the power of the spring 14, the armature 15 can move away from the permanent magnet, in the direction of its guiding shank or stem. The nose on the ring 11 slips by the armature, and then the light spring surrounding the stem of the armature moves the armature back to engagement with the permanent magnet in the assembly 16.

In Fig. 2, the variation in the time interval of generating the output pulse is shown as being controllable by the variable resistor 21. However, as already mentioned in connection with Fig. 1, control may be effected by means of a light-sensitive variable resistor, the value of which may be directly determined by the prevailing light conditions at the time of taking the photograph, so that the exposure time can be directly controlled automatically by an exposure meter or light meter, which is diagrammatically indicated at 1 in Fig. 1.

The normal locking magnet may advantageously be replaced by what is known as a pulse-controlled locking magnet, in which the field produced by the current from the timing unit is not directly opposed to the field of a permanent magnet, but merely serves to increase the magnetic resistance of the pole pieces of a magnetic system consisting of a highly permeable sheet of nickel-iron. A system of this type is indicated in Fig. 3. A permanent magnet 37 is arranged between two pole pieces 38 which are traversed by part of the magnetic lines of force. Located in the forward end of the pole pieces is a coil 34 which carries the output current from the time delay unit. When the coil 34 is energized by the output pulse of current, the front part of the pole pieces 38 become highly saturated and their magnetic resistance is increased, so that the lines of force will be displaced in a direction toward the permanent magnet 37, thereby decreasing the lines of force in the vicinity of the armature 15 and allowing the release of the armature. This arrangement permits the current in the winding 34 to be substantially larger, and the time constant of the electric circuit to be diminished, without the risk of the pulses adversely affecting the permanent magnet 37.

In the illustrated arrangement, the time which elapses between the opening and the closing of the shutter blades and which determines the speed or time of the photographic exposure, is seen to be under the control of electronic switching means. The advantages of such an arrangement are obvious. The moving parts, subject to wear and friction, which are present in time delay devices of the prior mechanical type, are eliminated and are replaced by non-moving parts having longer useful life. Also, the delay period or timing interval can be continuously varied through infinitesimal increments, by adjusting the electrical elements included in the time delay circuit, instead of the control being in somewhat discontinuous steps. Thus the exposure times or shutter speeds can be adapted more exactly to the prevailing lighting conditions. The electronic control means has the further advantage that the shutter timing or speed can be controlled automatically by a photocell used as an exposure meter or light meter.

However, when automatic control by an exposure meter or light meter is provided, it is desirable also to provide an additional manually operable control for varying the exposure time or shutter speed in accordance with another factor, as for example the size of the diaphragm aperture or stop, or the sensitivity or speed of the film employed in the camera, or the filter factor (if any) or a combination of any two or more of these factors. The diaphragm aperture control member may be suitably coupled with the circuit of the exposure meter or photocell, to result in an exposure value or light value combination.

In an automatically controlled camera of this kind, it is desirable to provide for some indication of the exposure time or shutter speed which the electronic control circuit will actually produce under a given condition of setting or adjustment. This is important, for instance, to enable the photographer to decide whether lighting conditions are such as to permit a short enough exposure to enable the camera to be held in the hand, or whether the exposure must be so long that it should be mounted on a tripod or other solid support. To this end, if the timing unit is under the control of a photocell, the exposure meter may be arranged in the electric circuit in parallel with the timing unit and may be so adjusted and calibrated that it gives the exposure time for which the timing unit is set.

Alternatively, the arrangement may be of the type illustrated schematically in Fig. 4. Here a photocell 121 is provided, which cooperates with an exposure meter of conventional design, the output current of the photocell flowing through a moving coil 122 in the magnetic coil field of the arcuate magnet shown. The moving coil is connected to a pointer 123 which moves across the scale 124 which, in this instance, is graduated in terms of shutter speed, with the usual numerals representing the denominator of a fraction whose numerator is 1, indicating fractional parts of one second as the duration of the exposure. The shutter assembly includes a conventional iris diaphragm, the size of the aperture or stop of which is controlled by rotating a ring 116 concentric with the optical axis, as usual. The iris diaphragm control 116 is coupled with the exposure meter in such a way that the meter reading is additionally influenced by the aperture setting. For example, the position of the scale 124 (and of the resistor 117, further mentioned below) may be shifted bodily by the rotation of a gear wheel 116a meshing with gear teeth on the ring 116, or the wheel 116a may be connected to the control member of a variable resistance which is in series with the circuit from the photocell 121 to the coil 122. In this last mentioned arrangement, assuming for the moment that the light intensity falling on the photocell 121 is constant, a change in the setting of the diaphragm aperture changes the resistance in the electric circuit of the moving coil, thereby altering the position of the moving coil in a manner complementary to the change in diaphragm aperture, so that as the diaphragm aperture is increased, the coil and pointer 123 move to a faster shutter speed or shorter exposure, and when the size of the diaphragm aperture is decreased, the coil and pointer move to a position representing a longer exposure or slower shutter speed.

The pointer 123 moves across a variable resistor 117, and carries a contact element 126. Normally the resilience of the pointer 123 keeps the contact 126 slightly away from the resistor 117 so that there is no rubbing friction on the resistor to interfere with the free movement of the pointer. But when the release button 125 (corresponding to trigger 12 in Fig. 1) is pressed, the movement thereof, in addition to tripping the shutter, also presses the contact element 126 against the variable resistance 117 in whatever position it occupies at the moment. Thus a variable resistance corresponding to the momentary setting of the exposure meter is interposed in the control circuit leading to the timing device or timing unit indicated schematically by the block 130, which in turn controls the time delay at which the pulse will be generated to operate the locking magnet 131, the rest of the action being similar to that previously described in connection with Fig. 1, where the timing unit 20 generates a delayed pulse to operate the locking magnet 16. Thus the duration of exposure is controlled as before by the electronic timing unit 130, but the time delay of this unit in turn is controlled by the value of the variable resistance 117 which is tapped off when the release 125 is actuated. In turn, the effective value of this resistance depends partly on the diaphragm aperture as set by the rotatable ring 116 and partly on the intensity of light from the subject being photographed, falling upon the photocell 121. Similarly, an adjustment for film sensitivity or for filter factor or both, can be incorporated in the circuit from the photocell 121 to the coil 122, so that the position of the pointer 123 and the effective value of the variable resistance 117 are influenced by film sensitivity or filter factor or both. The variable resistance 117 in Fig. 4 corresponds actually, in function and effect, to the variable resistance 21 in the circuit shown in Fig. 2.

As shown in Fig. 4, this embodiment may also utilize a depth of field indicator, the pointers 127 of which are geared to the ring 116 to move in opposite directions over the focus distance scale 128 which moves with the focusing ring of the lens, in the usual manner. A diaphragm aperture scale may be employed in connection with the ring 116, but is not really necessary when the depth of field indicators 127 are used, because it is only necessary for the operator to focus the lens for the proper distance of the principal object being photographed, and then move the diaphragm aperture adjustment 116 until the pointers 127 indicate the desired depth of field to include all other objects which the photographer desires to have within sharp focus, and then the release member 125 may be operated to make the exposure. All other settings are automatically provided for, and the correct shutter speed is automatically set by the electronic timing circuit with due regard to the diaphragm aperture which has been set, as determined by the selection of the desired depth of field. A glance at the scale 124 before pressing the release member 125 will indicate to the operator whether the prevailing light conditions are suitable for taking a photograph within the range of available shutter speeds.

In the embodiments thus far described, it is seen that electronic timing means is provided, which is triggered by the initial movement of a mechanical member for actuating the shutter blades, and which serves to control the length of time that the shutter blades remain open. But it is not necessary that the time interval controlled by the electronic means must necessarily be the time or duration of the exposure. It is within the scope of this invention to use such electronic time control means for controlling any other useful time interval in connection with a photographic shutter. For instance, the electronic time control unit can control the time relation between the opening of the shutter blades and the firing of a flash device (in order to synchronize the flash with the exposure), or can control the time interval between the movement of the shutter trigger or release member, and the beginning of the opening movement of the shutter blades (in order to allow a sufficient time interval to enable the photographer himself to get into the field of the picture), or can control the time interval during which a diaphragm aperture adjusting member is allowed to operate (thereby controlling the size of the diaphragm aperture rather than the duration or speed of the exposure). An example of this latter type of control (i.e., electronic control of the size of the diaphragm aperture) will now be described in connection with Fig. 5, which illustrates the construction schematically.

As here shown, the electronic time control unit is indicated as before by the block 20, controlled in part by the photocell 1 (which may be an exposure meter) and preferably employing also a manual control 21 for setting to other factors, just as was the case in Fig. 1. The output of the electronic timing unit 20 is fed, as before, to the locking magnet 16, so that when the pulse generated by the unit 20 reaches the coil of the magnet 16, it releases the armature 15 and allows the armature to move downwardly under the influence of the light hairpin spring 15a. Until current flows through the coil of the locking magnet 16, the attraction of the permanent magnet is sufficient to hold the armature 15 in place against the force of the spring 15a.

The iris diaphragm leaves or blades 213 are controlled by the usual adjusting ring 215 rotatable about the optical axis, and a spring 217 influences the ring 215 in one direction or the other, preferably tending to turn the ring from maximum aperture position toward smallest aperture position, although it could be the other way around. A gear train indicated in general at 219, including the usual escapement wheel or star wheel and vibrating anchor, is geared to the ring 215 to control the speed at which the ring may turn under the influence of the spring 217.

When the shutter is initially set or tensioned ready for making an exposure, the ring 215 is turned clockwise to its maximum extent, tensioning the spring 217, and is held in set or tensioned position by a suitable latch (not shown, but similar, for example, to the latch 12 in Fig. 1). Of course the master member of the shutter, for operating the shutter blades, is also set or tensioned, if the shutter is equipped with conventional shutter blades. The movement of the shutter trigger or release member releases the latch which holds the ring 215, and the initial movement of the ring operates the switch or switches (like the switches 17 and 18 operated by the master member 11 in Fig. 1) to start the operation of the electronic timing unit 20. The diaphragm aperture control ring 215 continues to turn, under the influence of its power spring 217, at a relatively slow rate determined by the operation of the gear retarding mechanism 219.

After a time interval dependent upon the illumination falling upon the photocell 1 (and the setting of the manual control 21) the electronic timing unit 20 transmits a pulse to the magnet 16, which thereupon releases the armature 15, which moves downwardly under the influence of its light spring 15a, until the pointed end of the stem or plunger of the armature 15 engages the gear teeth on the periphery of the ring 215, thereby stopping the further rotary movement of the ring. If the shutter has conventional blades to make exposures for still pictures, the shutter blades are then opened and closed to make the exposure, which in this instance may be of fixed duration, since differences in light value have been allowed for by adjustment of the diaphragm aperture. Any suitable mechanism may be employed for initiating the opening and closing movement of the shutter blades promptly upon completion of the adjusting movement of the diaphragm aperture adjusting ring 215. For example, the same movement of the armature 15 which serves to stop the adjusting movement of the diaphragm, may also release the master member of the shutter from its initial tensioned position.

This arrangement is particularly useful in certain types of cameras where it is preferable not to vary the shutter speed, but to adjust diaphragm aperture rather than shutter speed in order to take into account variations in light value or illumination. Examples of this are certain cameras for aerial photography, as well as certain types of motion picture cameras.

The electronic circuits employed in the embodiments thus far described, are relatively simple, and are easy to set, adjust, and calibrate. Moreover, without undue expense they can be made practically independent of the influence of temperature variation. The ability to have direct control of timing through a photocell or light meter, without any mechanical or other intermediate elements, is also an advantage flowing from the use of electronic control circuits.

Reference is now made to Figs. 6–9 of the drawings, illustrating a practical form of shutter embodying certain features of the present invention.

The shutter is of the objective type, and has a housing or casing 210 of the usual annular shape, with a tubular extension 212 on the rear wall of the housing, externally threaded for fastening the shutter to the camera structure, and internally threaded to receive the mounting rings or retaining rings for the rear component or components of the lens. Inside the housing is a base plate or mechanism mounting plate 214 of annular form, which in turn supports the front lens tube 216 in fixed position, this tube being internally threaded to receive the retaining rings or mounting rings for the front lens component or components, which extend across the exposure aperture indicated in general at 220. In the annular space 218 between the lens tube 216 and the outer cylindrical wall of the housing 210, forwardly of the mechanism plate 214, most of the control mechanism and operating mechanism of the shutter is located. Although the operating mechanism and control mechanism in the present instance is quite different from that of the conventional shutter which operates entirely mechanically without any electronic devices, yet it will be recognized by those familiar with shutters that the control and operating mechanism in the present instance is in the same approximate location as in conventional shutters, in a housing of approximately conventional shape and size, and the ability to control the shutter electronically while still using a housing of the familiar shape and size is one of the advantages of the present invention.

The shutter blades 222, of any suitable number (e.g., usually five or six blades, although only one is shown in Fig. 7, for the sake of clarity) are pivoted to swing across and close the exposure aperture when in closed position, or to swing back into the thin space 234 behind the mounting plate 214 and in front of the rear wall of the shutter housing, in approximately the usual manner, when the blades are opened to make an exposure. However, in the present instance, the shutter has two blade rings 226 and 232, the latter surrounding the former, both rotatable concentrically with the optical axis and lying in a suitable annular guideway in front of the mounting plate 214, formed for example on the rear face of a radial flange on the lens tube 216. Each of the shutter blades 222 is mounted on a pivot 224 which is fixed to and extends rearwardly from the inner blade ring 226. Each blade also has an oblique control slot 228 which receives a pin 230 fixed to and extending rearwardly from the other blade ring 232. Suitable arcuate slots are provided in the mounting plate 214, through which the various pins 224 and 230 extend, the slots being long enough to allow the necessary range of rotary movement of the respective blade rings.

The ring 226 has a radial arm 236, and the ring 232 has a radial arm 238, these arms being in such position that one overlies the other when the shutter blades are closed. In the vicinity of these arms there is a cocking cam or tensioning cam 240 in the general form of an eccentric on the shaft 242 which is mounted in the shutter housing for rotation about an axis parallel to but offset from the optical axis, as shown, and which extends out the back wall of the shutter housing to connect with and be operated by suitable mechanism in or on the body of the camera on which the shutter is mounted. For example, the shaft 242 is preferably operatively connected to the film winding mechanism of the camera in such manner that each time the film is wound to advance it by one exposure space or frame, the shaft 242 will be turned through one complete revolution.

The normal rest position of the shaft 242, between windings of the film, is the position in which the cam 240 lies with its lowest point toward the arms 236 and 238, as seen in Fig. 7. When the cam is turned through a complete revolution, it will engage both of the arms 236 and 238 and will move them clockwise to the cocked or tensioned position in which the arm 236 is shown in Fig. 7, the arm 238 being at that time directly under the arm 236. If the ring 232 is then allowed to turn counterclockwise from its tensioned position to its run-down or rest position shown in Fig. 7, the pins 230 will act on the slots 228 to swing the blades 222 to their open positions. If the ring 226 is then allowed to turn counterclockwise from its tensioned position shown in Fig. 7 to its run-down position, the movement of the pivot pins 224 will cause the blades 222 to swing to their closed positions.

Thus at the completion of an exposure, both rings 226 and 232 are at the extreme counterclockwise limit of their motion, with both arms 236 and 238 resting against the cam 240, and with the blades 222 in closed position. Then when the cam 240 rotates and swings both of the arms 236 and 238 simultaneously in a clockwise direction to their tensioned or cocked position, the entire shutter blade assembly will be turned bodily as a unit, in a clockwise direction relative to the shutter housing, through an angle subtended by the the throw of the cam 240, but no opening of the blades will occur during such movement.

The blade ring 226 carries a second radial arm 251 terminating in a radially extending pole piece or armature 252, and a power spring 246 connected to this arm tends to move the ring 226 in a counterclockwise direction. The other blade ring 232 likewise carries a second radial arm 253 terminating in a radially extending pole piece or armature 254, and a power spring 244 connected to this arm tends to turn the ring 232 in a counterclockwise direction.

Locking magnet assemblies are provided for holding the armatures 252 and 254 to maintain the respective rings 226 and 232 in tensioned or cocked position, until the time comes to release them for movement. The two locking magnet assemblies for cooperating with these respective armatures are mounted on the base plate or mechanism mounting plate 214 of the shutter, and are indicated in general by the respective numerals 248 and 250. They are identical with each other, and only one need be described in detail.

The locking magnet assembly or unit 248 comprises two iron cores 248b' and 248b", which constitute pole pieces and are surrounded by coils 248c' and 248c", respectively, through which the pulse of current from the electronic timing mechanism passes at the appropriate time. The pole pieces, as will be seen from the shape illustrated in Fig. 7, are so designed that the forward ends of the pole pieces are separated far enough to accommodate the necessary size of the coils 248c' and 248c", but rearwardly of the coils the pole pieces are placed relatively close together so that a magnetic shunt is obtained for the actual magnets 248a.

When the ring 226 is in its tensioned or cocked position, the armature 252 fastened to this ring lies against the faces of the pole pieces 248b' and 248b" and is attracted to them (so long as no current is flowing through the coils) sufficiently strongly to maintain the armature 252 in place, against the force of the spring 246. However, as soon as a pulse of electric current having the correct polarity passes through the coils 248c' and 248c", the pole pieces are demagnetized sufficiently so that the spring 246 pulls the armature 252 away from the pole pieces and moves the ring 226 through its operating cycle from its tensioned position to its run-down or rest position.

The other locking magnet assembly 250 operates similarly on the armature 254 connected to the other blade ring 232. When this blade ring 232 has been moved to its tensioned or cocked position, the armature 254 is held by the pole pieces 250b' and 250b" against the force of the spring 244, until such time as a pulse of electric current having the correct polarity flows through the coils 250c' and 250c", which deenergizes this locking magnet assembly sufficiently so that the spring 244 can pull the armature 254 away from the locking magnet. During the cocking or tensioning operation performed by rotation of the tensioning cam 240, the cam moves the armatures 252 and 254 far enough into the magnetic field of the pole pieces of the respective locking magnet assemblies 248 and 250, so that the attraction of the pole pieces pulls the armatures the rest of the way into full contact.

The pulse currents for releasing the armatures 252 and 254 from the respective locking magnet assemblies 248 and 250, are produced by an electronic timing unit or electronic time delay system of the same general character previously discussed in connection with the embodiment of Figs. 1 and 2, and likewise preferably employing transistors. The electronic system is fed from a suitable source, as for example the battery 256 (Fig. 9) located either in the shutter housing or, if more convenient, in the camera body. One pole of the battery is preferably grounded to the metallic body or housing of the shutter (directly or through the camera) while the other pole of the battery is connected to the electronic control circuit through a switch 258 actuated by a manual release plunger 260 shown schematically in Fig. 9 and shown structurally in Fig. 7. It may have a cone-shaped head 260a of insulating material which, when the plunger is depressed, forces the two contact springs of the switch 258 into contact with each other, these springs being normally separated. The spring 260b coiled around the plunger 260 normally biases the plunger in an outward direction, to keep the switch 258 normally open. On the arm 251 of the blade ring 226 there is an angular bent resilient flange 262 which, when the release plunger 260 is pressed radially inwardly, is first displaced downwardly (perpendicular to the plane of the paper in Fig. 7) by the conical part 260a, and then springs up and catches behind a shoulder 260c on the release plunger and holds the release plunger in its inner or switch-closing position so long as the arm 251 remains in its tensioned position, with the armature 252 in contact with the locking magnet assembly 248. When the current in the magnet assembly 248 releases the armature 252, and the ring 226 begins to rotate, the flange 262 pulls away from the shoulder 260c and frees the release plunger 260 so that its spring 260b may restore it to its normal rest position and allow the switch 258 to open again.

The right hand portion of the circuit diagram constituting Fig. 9 illustrates the major parts controlling the locking magnet assemblies 248 and 250, that is, the parts for controlling the time delay which determines the duration or speed of the exposure. The coils 248c' and 248c" in Fig. 7 are collectively represented by the coil symbol 248c in the diagram of Fig. 9, in which the coil symbol 250c similarly represents collectively the coils 250c' and 250c" of the magnet assembly 250 in Fig. 7. The circuit diagram of Fig. 9 also clearly shows the transistors 264 and 266, the time delay capacitor 268, the feed-back capacitor 270, the resistors 272 and 274 which act as a voltage divider, and the variable resistor 276 having an adjusting member 276a which may be positioned in accordance with a scale 278 (preferably calibrated in exposure time) which may be set manually, or in the same automatic manner disclosed in connection with the variable resistor 117 in Fig. 4, for determining the time of exposure.

As shown in Fig. 7, the locking magnet assemblies 248 and 250 and the switch 258 are separately mounted in the shutter casing, somewhat separated from each other. The remaining components of the electronic control system are preferably grouped together in a single assembly indicated in general at 280, which assembly 280 is fastened to the mounting plate 214 of the shutter, with an interposed layer of insulation material, and is electrically connected to the other parts of the mechanism by suitable conductors or leads which, in the main, pass through a cable 281 extending circumferentially around the shutter just inside the side wall of the housing. The short cross lines shown in Fig. 7 on various parts of this cable 281 indicate the number of conductors or leads within various sections of the cable. The connection to the battery may conveniently be made through a contact bushing indicated in general at 282, comprising an outer cylindrical metallic sleeve 282a (Fig. 6) projecting from the rear face of the shutter into a suitably formed socket on the camera body, and an inner metallic pin 282b insulated from the sleeve 282a and making contact with a suitable pin socket in the camera body, if the battery is placed in the camera body rather than directly in the shutter casing itself. When the shutter is mounted on the camera body during assembly, the connection parts 282 automatically make contact with the proper connection parts on the camera body.

If the shutter speed is to be controlled partly or entirely manually rather than entirely automatically, there is preferably a shutter speed adjusting ring 284 rotatably mounted at the front of the shutter, having a slightly projecting rim or rib which is knurled for easy grasping and manual turning. A shutter speed scale 278 (Figs. 6 and 9) may be marked on the shutter casing and be read in conjunction with an index mark or pointer 284a on the ring 284, or the index mark may be placed on the housing and the scale may be placed on the rotatable ring. Throughout a portion of its periphery, the ring 284 has internal gear teeth 284b (Figs. 7 and 8) which mesh with a pinion 286 on a shaft 286a journaled in the electronic assembly 280 and connected to the adjusting member 276a (Fig. 9) of the adjustable resistor 276, adjustment of which controls the exposure length. For instance, the shaft 286a may be directly connected to a wiper arm which sweeps over the variable resistor to tap off the desired resistance. The details of a variable resistor which can be adjusted through a range of several turns of a shaft are known per se and need not be further described here.

A shutter comprising essentially the parts thus far described may be used to take ordinary or normal daylight pictures, the specific operation being further explained below. However, it is desirable also to provide the shutter with a flashlight synchronizing device, and with a delayed exposure device enabling the operator to get into the picture. The structural arrangement and location of these devices is shown in Fig. 7, and the electronic circuits in connection therewith are shown in the left hand part of Fig. 9.

A three-pole switch assembly 288 is fastened to the mechanism plate 214, with interposed insulation, a little to the left of the electronic unit 280. This switch assembly is provided with a switch actuator arm 288a which projects from the shutter casing through a suitable slot, to an externally accessible position where it may be moved by the finger of the operator to any one of three possible positions. The switch actuator arm swings on the shaft 288b, and may be held in any one of its three positions by any suitable frictional means such as spring detents, not shown. The three positions are indicated by the markings M, X, and V on the periphery of the shutter casing 210. The switch actuating arm 288a is connected to two separate contact arms 288c and 288d, the arm 288c being in contact with a contact plate having three spaced contact portions 288e, while the arm 288d is in contact with another contact plate having three similarly spaced contact portions 288f.

A locking magnet assembly 300, which may be constructed identically with the magnet assembly 248 previously described, is mounted at an appropriate place in the housing 210. This locking magnet assembly operates on an armature 302 formed as part of a spring switch arm, the resilience of which normally tends to separate the armature from the magnet. The switch arm is connected through an insulating block 304 to a switch contact 306. When the armature 302 is in contact with the pole pieces of the magnet 300, the switch 306 is open. When a pulse of current passes through the winding 300c of the magnet 300, reducing the magnetic attraction, the armature 302 springs away from the pole pieces of the magnet and this closes the switch 306. The spring arm which carries the armature 302 is so shaped (see Fig. 7) that it lies in the path of the cam 240, so that when the cam makes its revolution to cock or tension the shutter, it also swings the spring arm of the switch to carry the armature 302 against the locking magnet 300 and thus to open the switch 306.

Mounted on and suitably insulated from the plate 214 of the shutter, in the space between the manual switch 288 and the locking magnet assembly 300, is a second electronic control unit 308. This control unit contains the electronic parts illustrated at the left hand side of the wiring diagram, Fig. 9, including mainly the transistors 310 and 312, the time delay capacitor 314, the feed-back capacitor 316, the fixed resistors 318 and 320, and the voltage divider resistors 322 and 324. The circuit diagram in Fig. 9 shows clearly the details of the electronic connections between these parts, and also the relationship of these parts to the switch arms 288c and 288d. It will be seen that when the switch 288 is in the "X" position, the transistors 310 and 312 are not included in the operative circuit, but when the switch 288 is in either of the positions "M" and "V" these two transistors are included in the circuit.

The shutter is also provided with a switch 326, which is normally open and which is located in position to be closed by the arm 238 on the blade ring 232 just as this blade ring reaches its rest position at completion of full opening of the shutter blades. This switch 326 is the flashlight contact switch for "X" or instantaneous synchronization, and serves (as seen in Fig. 9) to close an electric circuit leading from the switch 258 through the switch 288 (when in its central or "X" position) to the switch 326 and thence to the flash lamp 328, through a two-pole connector plug or outlet 330 of any suitable known form, shown schematically in Figs. 7 and 9 and adapted to receive the usual cord or cable leading to the flash equipment. This flash circuit may be fed with current from the same battery 256 which is used to operate the electronic control of the shutter, although a separate battery may be used if preferred. If the flash lamp 328 is of the so-called instantaneous type or "X" type, such as the well known Edgerton form of lamp (with no appreciable time lag between closing the circuit and emission of maximum illumination) it is seen that the circuit will be closed and maximum illumination will be produced substantially simultaneously with the full opening of the shutter blades.

The elements or components of the electronic control circuits shown in Fig. 9 are indicated by the normal conventional circuit symbols, and are conventional in design, carrying out functions which will be readily apparent to those skilled in the field of transistor circuits, without additional explanation. It may be mentioned in passing, however, that the transistors 264, 266, 310, and 312 are operated as controlled switches or switching transistors, while the feed-back capacitors 270 and 316 feed back the control pulse which begins at the coils 248c and 300c, amplified by the transistors 266 and 312, respectively, to the transistors 264 and 310, respectively. The voltage dividers 272, 274 and 322, 324 control the bias for the transistors 266 and 312, respectively. As shown in the circuit diagram in Fig. 9, the various components of the electronic system are mutually connected, and the transistors are shown as operating in switching circuits of the grounded emitter type.

It does not seem necessary to give a detailed description of the various connecting leads, which are clearly shown diagrammatically. It may be mentioned, however, that the capacitor 268 which is interposed in the control current circuit of the exposure time control unit is not subject to a load in this circuit when the transistor 264 exercises a blocking function. Thus the exposure time for which this control unit is set, exhibits a proportional relationship with the product of the resistor 276 and the capacitor 268. In this way it is possible to obtain exposure times up to a maximum of roughly thirty seconds, while still using an extremely small capacitor. The demagnetization pulse for the locking magnets is obtained mainly from the capacitor, so that by this means, especially with long exposure periods, the battery is relieved from the effects of current surges.

Typical operation of the shutter is as follows: When an exposure is to be made, the film must first be fed by actuating the film winding knob or lever on the camera. This serves to turn the cocking shaft 242 and cam 240, thereby placing the shutter mechanism in tensioned or cocked position, ready for an exposure, the two blade rings 226 and 232 being moved to their extreme clockwise position, and the armatures 252 and 254 being retained against the pole faces of the locking magnet assemblies 248 and 250. If the exposure time is to be controlled manually, the operator turns the time control ring 284 to bring the mark 284a opposite the desired time of exposure on the shutter speed scale 278. Even this adjustment is unnecessary if the exposure time is set automatically by a photocell in the manner previously described.

To make an exposure of the ordinary normal kind, without the use of flash illumination and without an initial delay of the commencement of the exposure, the switch 288 is normally placed with the handle 288a in the "X" position. This is the middle of the three positions, and the electrical circuit effect of such position of the switch is shown in Fig. 9. To make the actual exposure, the operator merely depresses the release plunger 260. The tapered head 260a of the release plunger first closes the switch 258, and then is kept in switch-closing position by the resilient flange 262 on the arm 251.

As soon as the switch 258 is closed, a circuit is completed from the battery 256 through the arm 288c of the switch 288 (when in its "X" position) to the electronic timing unit 280, the components of which are shown near the right hand part of Fig. 9. The locking magnet 250 is immediately demagnetized because the transistor 266 is rendered conductive by the voltage applied to its base by the voltage divider 272, 274.

Owing to the demagnetization of the pole pieces of the locking magnet assembly 250, there is no longer sufficient attraction between these pole pieces and the armature 254, so that the spring 244 pulls the armature 254 away from the locking magnet assembly and turns the blade ring 232 in a counterclockwise direction, opening the shutter blades 222. Simultaneously, the capacitor 268 is charged through the variable resistor 276 which has been adjusted in accordance with the desired exposure time (either manually, or through the automatic adjustment controlled by a photocell) until the emitter potential of the transistor 264 falls below the base potential provided by the transistor 266. At this moment, the flow of current commences through the transistor 264, and the connection through the capacitor 270 to the base of the transistor 266 accelerates the process, so that now a sudden change in current occurs. The pulse of current now flows to the coils 248c of the locking magnet assembly 248, demagnetizing the pole pieces of this magnet assembly so that the armature 252 is no longer sufficiently attracted to this magnet assembly, and the spring 246 pulls the armature away, rotating the blade ring 226 in a counterclockwise direction and closing the shutter blades.

Thus a normal exposure is made. The time constant of the capacitor 268 and of the resistor 276, which was set when adjusting the exposure time, governs the interval of time elapsing between the pulse of current which demagnetizes the magnet assembly 250, and the second pulse which demagnetizes the magnet assembly 248, and the consequently this time constant controls the shutter speed or exposure time. As soon as the arm 251 carrying the armature 252 starts to move away from the magnet assembly 248, the resilient flange 262 is withdrawn from the shoulder 260c of the plunger 260, so that the plunger is restored to its normal rest position by its spring 260b and switch 258 is thereby opened, preventing any further current from being taken from the battery 256.

If a picture is to be taken with flash illumination having substantially no time lag (that is, flash of the instantaneous or "X" type) then all that is needed is to plug in the flash lamp by connecting its cord to the separable connector 330. The manual switch 288 is left in the middle or "X" position. There is no change whatever in the operation of opening and closing the shutter blades, this being performed exactly as described above. The arm 288d of the switch 288, when in the "X" position, rests on a vacant or blank contact, and performs no function. The other arm 288c when in the "X" position, provides a circuit path as seen in Fig. 9 and permits the operation exactly as above described. But in addition, the closing of the switch 326 by the arm 238 on the blade ring 232, at the instant of full opening of the blades, completes the electric circuit through the separable connector 330 to the flash lamp 328, thus flashing this lamp while the blades are fully open. In fact, this switch is always closed when the blades reach open position during every exposure, but of course the closing of this switch performs no function if no flash lamp is connected to the separable socket or connector 330, or if a flash lamp connected to this socket has previously been ignited, as would be the case when operating under "M" synchronization conditions.

If, instead of using an instantaneous or Edgerton type of flash lamp, it is desired to take a picture with an ordinary flash bulb having an appreciable time lag of, say, sixteen or twenty milliseconds between the closing of the electric circuit and the production or maximum illumination, it is necessary to close the flash lamp circuit a little in advance of the demagnetization of the locking magnet assembly 250, to allow sufficient time for the flash bulb to reach its peak of illumination so that such peak of illumination will occur simultaneously with full opening of the shutter blades. To accomplish this, the switch actuating arm 288a is swung manually to the left (when viewed as in Fig. 7) to the position marked "M." This throws the switch contact arm 288c into engagement with a double contact shown to the left of the switch arm in Fig. 9, so that this switch arm connects the main switch 258 both with a circuit leading, as shown, to the flashlight connector plug 330, and also with a separate circuit leading to the upper end (as seen in Fig. 9) of the capacitor 314, the magnet 300c, etc., in the timing unit 308. The corresponding position of the other switch arm 288d of the switch 288 also connects the resistor 320 in parallel with the resistor 318, so that the time constant now depends on the combined effect of the two resistors 320 and 318 as well as the capacitance of the capacitor 314, and the values of these elements 314, 318, 320 are so chosen that the time constant or time delay of this electronic control unit will be substantially equal to the time lag (e.g., 16 milliseconds or 20 milliseconds) of the flash bulb being used. In fact, the resistor 320 may be in the nature of a manually adjustabe potentiometer, calibrated in milliseconds, permitting it to be adjusted to the particular lag of the particular flash bulb intended to be used.

With this setting of the parts as just described, if the release plunger or trigger 260 is now depressed, the battery 256 will be connected through the closed switch 258 and through the switch arm 288c, to the circuit leading through the connector plug 330 to the flash bulb 328, and also to the circuit of the timing unit 308. Thus the flash bulb 328 will be ignited and, simultaneously, current will begin to flow through the transistor 312, and the capacitor 314 starts to charge, via the resistors 318 and 320. This continues until the emitter potential of the transistor 310 falls below the base potential, at which moment current starts to flow through the transistor 310, and the feed-back through the capacitor 316 to the base of the transistor 312 accelerates the process, with the result that a switching action occurs and a sudden surge or pulse of current flows through the coil 300c of the locking magnet assembly 300, releasing the armature 302 so that the switch 306 closes and energizes the timing unit 280.

The closing of the switch 306 occurs at a controlled time interval after the closing of the switch 258, and therefore the flash bulb 328 (ignited simultaneously with closing the switch 258) has almost reached its peak of illumination at the time that the switch 306 closes. The closing of this switch energizes the time control unit 280 in the same manner that it would be energized directly by closing the switch 258 if the switch arm 288c were in its middle or "X" position. From this point onward, the action is the same as previously described in connection with making an ordinary daylight exposure, the locking magnet assembly 250 being first actuated to release the blade ring 232 to open the shutter blades, which reach their fully open position just as the flash lamp 328 reaches its peak of maximum illumination. At the proper time interval after actuation of the locking magnet assembly 250, the other locking magnet assembly 248 is actuated as before, so that the second blade ring 226 is released for movement and the shutter blades are closed, this movement serving also to release the plunger 260 so that it springs out again to its normal rest position.

If it is desired to make an exposure with delayed opening of the blades, so that the photographer himself may get into the picture after tripping the shutter, this may be accomplished by moving the manual switch actuator 288a to the right when viewed as in Fig. 7, to the "V" position. This moves the switch arm 288c to the right hand one of its three contacts in Fig. 9, and it will be seen from the circuit diagram that this right hand contact is in the same circuit with the left hand contact, so that the same action occurs in this part of the circuit as when the switch is set for "M" position, except that there is no connection of the switch arm 288c to the separable plug 330 leading to the flash lamp 328. However, the flash lamp plug 330 is still connected through the circuit as shown, to the switch 326, although not connected to the switch 288c.

The movement of the switch actuator 288a to the "V" position also moves the arm 288d of this switch to the right hand contact shown in the wiring diagram, which is a blank or vacant contact. Therefore, the resistor 320 is taken out of the circuit leading to the emitter of the transistor 310, but the resistor 318 is left in the circuit. Hence the time constant or time delay interval elapsing between the closing of the switch 258 and the closing of the switch 306 is altered and made considerably longer (e.g., roughly about 12 seconds) so that after pressing the release 260, the operator has an interval of several seconds in which to move to a position in front of the camera so that he will be in the picture. When the switch 258 is closed, this activates the time control unit 308 which now operates the same as the operation when set for "M" synchronization, except for the much longer timing interval, due to the removal of the resistor 320 from the circuit. After the delay of several seconds, the locking magnet assembly 300 is subjected to the demagnetizing current, which closes the switch 306 and starts the operation of the timing unit 280 just as before, so that the shutter blades open and close for the exposure, as previously described.

When using the delayed exposure mechanism (position "V" of the switch 288) flash photographs cannot be taken with "M" bulbs, but can be taken with "X" type of flash illumination. The switch 326 is closed at every actuation of the shutter blades, just as the blades reach their fully open position; therefore if a flash lamp of the "X" type is connected to the socket 330, the lamp will be flashed at the instant of full opening of the blades, in the same manner as when the switch 288 is set for "X" position.

It will be noted that all components of this electronically operated shutter are mounted in the shutter housing or casing, except the battery itself which may conveniently be placed in the camera body. Because of the control of timing by electronic means rather than by mechanical means, the timing can be done much more accurately, with greater uniformity of operation from one cycle to another. Also, the electronic timing intervals may be regulated or adjusted through practically infinitesimal increments, within the required wide range of setting. The adjustment and calibration of the circuits is extraordinarily simple. Also the operation of the control system is noiseless, and does not cause shocks or vibrations such as are caused by operation of mechanical timing means.

With an electronic timing system according to the present invention, control of pulses at time intervals of the order of magnitude of 1/40,000th of a second may be accomplished. However, because of the mechanical drive system of the shutter, it is not possible for such extremely short time delays to be fully utilized. But it is possible, in practice, to have the shutter operate satisfactorily with exposure times as short as approximately 1/1000th of a second.

Another advantage of a shutter according to the present invention is that the manually operated members (e.g., the release plunger 260, the variable resistor 276, and the switch 288) need not be physically operated at the location of the shutter itself, but all may be operated easily by known types of remote control. Also, although it is desirable, when producing an objective shutter, to have all of the control mechanism in the normal shutter housing or casing, yet it is within the scope of this invention to place some or all of the electronic control mechanism outside of the shutter housing, for instance, in the body or housing of the associated camera.

Another important feature of the invention is that the three locking magnet assemblies 248, 250, and 300 may all be of identical design and construction, thus enabling mass production of such locking magnet assemblies in larger quantities, instead of producing smaller quantities of three different designs. In addition to the mass production feature, the use of identical locking magnet assemblies 248 and 250 and 300 is also advantageous, because duplicate assemblies of this kind will have the same time lag characteristics in their operation (roughly about 3 or 4 milliseconds) and thus the time lag in the operation of one of these magnet assemblies will be cancelled out, as a practical matter, by the time lag in the next magnet assembly, so that the time lag of the magnet assemblies does not affect the length of exposure or the accuracy of flash synchronization.

When using a shutter speed adjusting ring rotatable by hand, like the ring 284 in the present embodiment, it is advisable, by appropriate choice and dimensioning of the electronic control elements, to design the associated exposure scale or shutter speed scale 278 so that it may be graduated in a linear manner. The term linear manner, as here used, means that successive graduations which differ from each other by the same factor (in this instance, the factor of 2) are spaced at uniform angular distances circumferentially around the shutter housing. (For the sake of convenience, the numbers on the scale are rounded off, running 1, 2, 4, 8, 15, 30, 60, 125, 250, 500, and 100, rather than the theoretical numbers of 1, 2, 4, 8, 16, 32, 64, 128, 256, 512, and 1024.) When the electronic control is so designed that the scale may be graduated in this linear manner, then it is possible to couple the shutter time adjusting member, if so desired, with a diaphragm aperture adjusting member for conjoint turning and adjustment of the diaphragm aperture in a manner complementary to the adjustment of the shutter time or speed, in the manner disclosed for example in the United States Patent No. 2,829,584, granted April 8, 1958, for an invention of Kurt Gebele.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising blades movable between closed and open positions, mechanical means movable through a first operation to open said blades and through a second operation to close said blades, spring means tending to move said mechanical means through both said first and second operations, a locking magnet having a permanent magnet core for holding said mechanical means against movement through its second transistor having its collector connected in series nected to said locking magnet, an electronic timing circuit including means for transmitting a demagnetizing current pulse to said coil at a controlled time interval after said circuit is activated, to demagnetize said locking magnet sufficiently so that said mechanical means may move through its second operation to close said blade, said timing circuit including a first transistor, a second transistor having its collector connected in series with said demagnetizing coil, circuit means connecting the base of said second transistor to the collector of said first transistor, and means for supplying current to said first transistor to activate said timing circuit, and shutter release means movable to initiate an exposure-making operation of the shutter, said mechanical means including two rotary rings each rotatable from a tensioned position to a run-down position, such rotation of the first of said rings constituting said first operation to open said blades, such rotation of the second of said rings constituting said second operation close said blades, and in which said means for supplying current to said first transistor to activate said timing circuit includes electric switch means closed by movement of said shutter release means.

2. A construction as defined in claim 1, in which said locking magnet holds said second ring against rotation from tensioned position to run-down position, further including a second locking magnet having a permanent magnet core holding said first ring against rotation from its tensioned position to its run-down position, a second demagnetizing coil operatively connected to said second magnet, and circuit means operatively connecting the collector of said first transistor in series with said second demagnetizing coil to supply current to said second coil from said first transistor to demagnetize said second locking magnet so that said first ring may rotate to open said shutter blades.

3. A photographic shutter including blades movable between closed and open positions, a first blade ring and a second blade ring both rotatably mounted for movement between respective rest positions and tensioned positions and both operatively connected to said blades to open said blades when said first ring moves from tensioned position to rest position and to close said blades when said second ring moves from tensioned position to rest position, spring means resiliently urging both of said rings toward their respective rest positions, a first magnet having a permanent magnet core for holding said first ring in its tensioned position against the force of said spring means, a first coil serving, when energized, to alter the magnetic flux of said first magnet sufficiently to release said first ring for movement to its rest position, a second magnet having a permanent magnet core for holding said second ring in its tensioned position against the force of said spring means, a second coil serving, when energized, to alter the magnetic flux of said second magnet sufficiently to release said second ring for movement to its rest position, and electronic timing means for energizing said first coil and said second coil in predetermined timed sequence with respect to each other, to cause said rings to open and close said blades.

4. A photographic shutter including blades movable between closed and open positions, a first blade ring and a second blade ring both rotatably mounted for movement between respective rest positions and tensioned positions and both operatively connected to said blades to open said blades when said first ring moves from tensioned position to rest position and to close said blades when said second ring moves from tensioned position to rest position, spring means resiliently urging both of said rings toward their respective rest positions, a first magnet having a permanent magnet core for holding said first ring in its tensioned position against the force of said spring means, a first coil serving, when energized, to alter the magnetic flux of said first magnet sufficiently to release said first ring for movement to its rest position, a second magnet having a permanent magnet core for holding said second ring in its tensioned position against the force of said spring means, a second coil serving, when energized, to alter the magnetic flux of said second magnet sufficiently to release said second ring for movement to its rest position, first electronic timing means serving, when activated, to energize said first coil and said second coil in predetermined timed sequence with respect to each other, to cause said rings to open and close said blades, a shutter trigger switch, a second switch, second electronic timing means serving, when activated, to close said second switch at a controlled time interval after activation of said second timing means, and switching means movable between one position in which said trigger switch is directly connected to said first electronic timing means and serves to activate said first timing means upon closing of said trigger switch, and a second position in which said trigger switch is directly connected to said second electronic timing means and serves to activate said second timing means upon closing said trigger switch and closing of said second switch by the activated second timing means serves to activate said first timing means.

5. A construction as defined in claim 4, further including a photo flash lamp operatively connected to and at least partially under control of one of said switches.

6. A construction as defined in claim 5, further including shiftable means for altering the time delay characteristics of said second electronic timing means to provide selectively a relatively long delay of several seconds between the closing of said trigger switch and the closing of said second switch, to enable a photographer to place himself in a picture to be taken, or a relatively short delay of a fraction of a second between the closing of said trigger switch and the closing of said second switch, to enable synchronization of the opening of said shutter blades with the maximum illumination of a time-lag flash lamp connected to and fired by the closing of said trigger switch.

References Cited in the file of this patent

UNITED STATES PATENTS

| | | |
|---|---|---|
| 1,687,123 | Deckel et al. | Oct. 9, 1928 |
| 2,188,803 | Boehne | Jan. 30, 1940 |
| 2,346,079 | Newton | Apr. 4, 1944 |
| 2,573,729 | Rath | Nov. 6, 1951 |
| 2,577,774 | Lee | Dec. 11, 1951 |
| 2,803,814 | Bloser | Aug. 20, 1957 |
| 2,861,506 | Leder et al. | Nov. 25, 1958 |

UNITED STATES PATENT OFFICE
CERTIFICATE OF CORRECTION

Patent No. 2,978,970                                          April 11, 1961

Paul Fahlenberg

It is hereby certified that error appears in the above numbered patent requiring correction and that the said Letters Patent should read as corrected below.

Column 17, line 15, for "100" read -- 1000 --; line 43, strike out "second transistor having its collector connected in series" and insert instead -- second operation, a demagnetizing coil operatively con- --; same column 17, line 50, for "blade" read -- blades --; line 62, for "operation close" read -- operation to close --.

Signed and sealed this 21st day of April 1964.

(SEAL)
Attest:
ERNEST W. SWIDER

Attesting Officer

EDWARD J. BRENNER
Commissioner of Patents